S. E. McKNIGHT.
POTATO CUTTING AND PLANTING MACHINE.
APPLICATION FILED APR. 12, 1909.
971,064.
Patented Sept. 27, 1910.
2 SHEETS—SHEET 1.
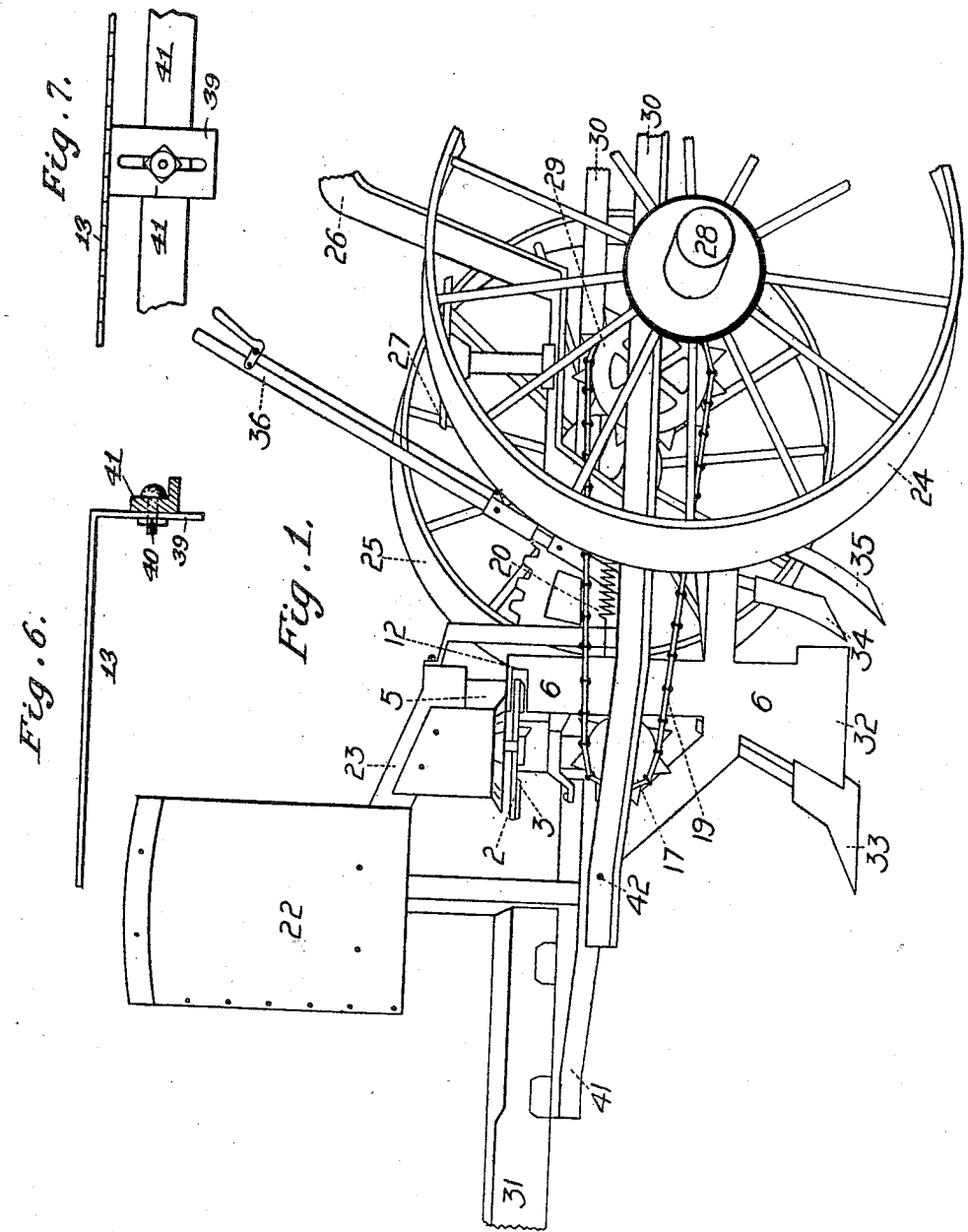
WITNESSES:
Ward Randolph
H K Wing
Ward Randolph
INVENTOR.
Stephen E McKnight
BY
John F. Mullaney
ATTORNEY.

S. E. McKNIGHT.
POTATO CUTTING AND PLANTING MACHINE.
APPLICATION FILED APR. 12, 1909.
971,064.
Patented Sept. 27, 1910.
2 SHEETS—SHEET 2.
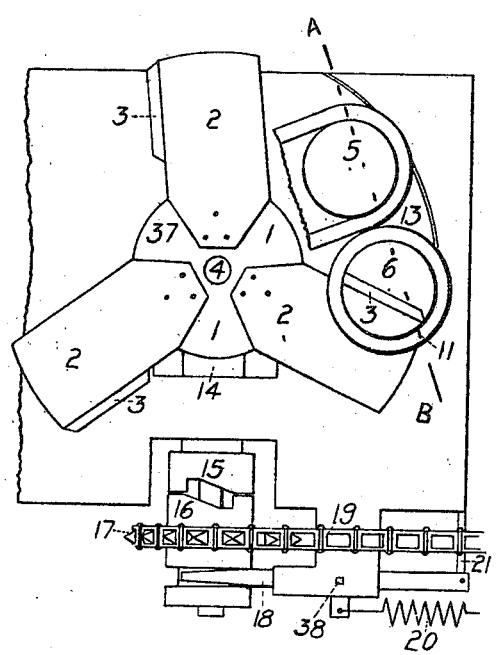
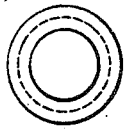
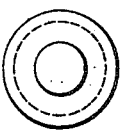
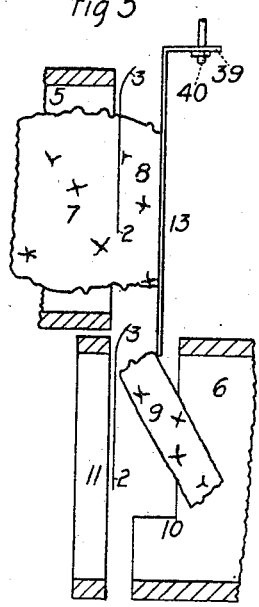
WITNESSES:
Ward Randolph
Katherine Sheeran
INVENTOR
Stephen E. McKnight
BY
John F. Mullaney
ATTORNEY
THE NORRIS PETERS CO., WASHINGTON, D. C.

UNITED STATES PATENT OFFICE.

STEPHEN E. McKNIGHT, OF COLORADO SPRINGS, COLORADO.

POTATO CUTTING AND PLANTING MACHINE.

971,064.

Specification of Letters Patent. Patented Sept. 27, 1910.

Application filed April 12, 1909. Serial No. 489,489.

*To all whom it may concern:*

Be it known that I, STEPHEN E. MC-KNIGHT, a citizen of the United States, residing at Colorado Springs, in the county of El Paso and State of Colorado, have invented a new and useful Potato Cutting and Planting Machine, of which the following is a specification.

My invention relates to improvements in potato planters, in which a rotating three bladed knife is made to cut potato seed, as the potatoes, one at a time, are fed down through a sleeve or holder from a box, or magazine, and the seed being carried to the top of a well or spout and dropped down to a furrow in the ground; and the objects of my invention are, first, to provide a seed cutting attachment in combination with proper means for planting the potatoes immediately after the seed is cut so that it will be fresh, and especially as required in arid regions, and to provide means for using different sizes of potatoes and means for planting the potatoes at desired depths and cultivating them. I attain these objects by the mechanism illustrated in the accompanying drawings in which:—

Figure 1, is a perspective view from the left hand upper front side of the machine with part of tongue and part of driver's seat and part of left drive wheel removed. Fig. 2, is a top view of the three bladed revolving knife and part of gear operating same. Fig. 3, is a top view of the smallest size of the holder sleeves. Fig. 4, is a top view of the medium size holder sleeve. Fig. 5, is a rear view of an upright section on the line A—B, Fig. 2 of a part of one of the holder sleeves and adjacent parts showing part of a potato cut and being cut. Fig. 6, is a front elevation of the slide table 13, showing the manner of its connection by the clamp bolt 40, through the adjusting clip 39, and through the right hound 41. Fig. 7, is a side elevation, showing the left face of the right side of Fig. 6, and exposing the slot in adjusting clip 39, provided to permanently and adjustably fix the location of slide table 13, in relation to the blades 2, above it.

Similar figures refer to similar parts throughout the several views.

The axle 28, the iron side pieces 30, 30, the well tube or conductor 6, and the revolving cutter 37, with its actuating gear, constitute the principal parts and frame of my machine. The revolving cutter 37, provided with three or more cutting blades and revolving horizontally on a vertical shaft 4, passes under and close to the bottom of holder sleeve 5, which contains a potato and which potato has been pushed by the weight of the potatoes above it down below the bottom of the holder sleeve 5, and rests on the top of the slide table 13, as shown in Fig. 5. When one of the blades 2, comes into contact with the potato, it cuts the seed or cutting the thickness of the distance between it and this slide table 13, and carries or pushes the potato seed cutting along until it gets over the top of the well tube or spout 6, where the front edge of the cutting of the seed is forced into contact with the cleaning guard 10, which stops the progress of the cutting or the seed, and forces it from its adhesion to the under side of the cutting blade 2, when it drops down into the well tube or spout 6, and passes into the furrow made in the ground below by the plow nose or point 33, and the bottom part 32, of the well tube 6. The soil then closes over the seed which is covered by the two shovels 34 and 35. As shown, the supply of potatoes is held in box 22, and the potatoes are fed down through the conveying chute 23, to the holder sleeve 5, where they are sustained one above the other and pass down as the potato seed is cut off and removed.

There is a seat 27, provided for the person attending to the feeding and there is a seat not shown on the spring 26, provided for the driver and operator of the machine. The tilting lever 36, is arranged and provided with means for raising and lowering the plow nose 33, at the will of the operator for different depths of planting and different conditions of soil.

On the axle 28, to the left of the center of the machine is provided a sprocket wheel 29, which drives sprocket chain 19, which drives small sprocket wheel 17, on shaft 14 and is provided on its hub with the release clutch 16, made to engage the permanent clutch 15, rigidly attached to the horizontal line shaft 14, which is provided with a bevel gear connected to a similar bevel gear not shown near the bottom end of the upright shaft 4, and by this means the upright shaft 4, and the revolving cutter rigidly attached to its top end are turned.

There is provided three different holder sleeves for different sizes of potato seed, the one shown in Fig. 2, is No. 5, or the largest size while Fig. 4, shows the medium size and Fig. 3, the smallest size.

When the operator wishes to throw the machine out of gear at the end of a row, he stops the revolving cutter by moving the slide bar 21, to the left thus pushing the rear end of the clutch lever 18, to the right and forcing its front end to the left thus sliding release clutch 16, to the left and disengaging it from the permanent clutch 15, which stops the motion of the revolving cutter 37, and by pulling backward on the tilting lever 36, he raises the plow nose 33, with its covering shovels 34, and 35, from the ground.

It is intended to have potatoes that are to be planted, sized by passing them through screens of different size mesh, and the operator of the machine chooses the holder sleeve appropriate for the size of the seed he is about to use. It is presumed that small seed will not be planted to an advantage in holder sleeve 5, as the seed potatoes pass each other or bind in their descent or allow two seeds to be cut at a time and therefore I have provided different sizes of holder sleeves for different sizes of seed potatoes.

I have provided means in bolt 40 for adjusting the slide table 13, up or down so as to make thin or thick slices of seed under the cutter 8.

When the revolving cutter 37, is thrown out of gear the clutch is held out by the tension of the coil spring 20, which is attached to a small side lever near the pivotal point 38, of clutch lever 18. When a piece of seed from the potato 7, is cut off by the blade 2, the moisture in the potato causes the seed to adhere to the under side of blade 2, in many instances. Should it do so, when it comes over the top of the well tube 6, it would not drop off but would be carried on around again. To avoid this condition I have provided the cleaning guard 10, which is extended up to a height sufficient to catch the front edge of the potato seed, but not high enough to engage the blade 2, or the conveying flange 3, so that if potato seed comes in contact with the cleaning guard 10, it forces it from its adhesion to the under side of blade 2, and it drops down into the well tube 6.

To provide for contingencies in which the potato seed may not adhere to the under side of blade 2, so the potato seed would not be carried on to the well tube 6, but would remain on top of slide table 13 I have provided the conveying flange 3, at the back and below the level of the edge of each of the blades 2, which conveying flange 3, will come in contact with the rear edge of the top of the potato seed, and force it along over the surface of the slide table 13, until it is finally dropped into the well tube 6.

The slide table 13, is adjusted vertically by means of a clip 39, which has a slotted hole and is clamped by means of clamp bolt 40, to a bracket of the frame.

The speed of the revolving cutter 37, I have arranged to change by placing different sizes of sprocket wheels 29, on the axle.

In raising and lowering the plow nose 33, by means of tilting lever 36, the tongue 31, which is rigidly attached to the hounds 41, is hinged to the flange side frame pieces 30, 30, by means of the hound's bolt 42.

I claim as my invention and ask for Letters Patent for:—

1. In a potato seed cutting and planting machine, the combination of a horizontally revolving disk and means for operating same from the driving gear connected with the drive wheels of the planter, the clutch connections 15 and 16, and means for separating them, a plurality of cutting blades 2, attached rigidly to said disk and extending radially and on the same plane from its edge and having a downwardly and backwardly, projecting lip 3, on the rear edge of each cutting blade, to engage a potato cutting, a receptacle for carrying potato seed, provided with an outlet in the bottom thereof, a downwardly projecting spout extending from said outlet to convey the potato seed to the holder tube 5, a holder tube 5, above the path of the said blades, a table below said holder tube to check the drop of the potatoes from the holder tube, means for adjusting said table with respect to said blades, a well tube below said blades to receive the potato seed cutting, and a plow 33, to open a furrow in the soil, substantially as set forth.

2. In a potato seed cutting and planting machine, the combination of a horizontally revolving disk and means for operating same from the driving gear connected with the drive wheels of the planter, the clutch connection 15 and 16, and means for operating same, a plurality of cutting blades attached rigidly to said disk and extending radially and on the same plane from its edge and having a downwardly and backwardly projecting lip 3, on the rear edge of each of said cutting blades to engage a potato, a receptacle above said disk for carrying a supply of potato seed, an outlet in the bottom of said receptacle, a downwardly projecting tube extending from said outlet to convey the potato seed to the holder tube, a holder tube, above the path of said blades, a table below said holder tube to check the drop of the potatoes from the holder tube, a clip 39 integral with said table, provided with an elongated hole, a well tube below said blades at one side of the said holder tube, to receive the potato seed cutting immediately after it is forced from said table, a cleaning guard 10, projecting above the left side of the well tube 6, to prevent the passage of a potato seed cutting over the top of the said well tube 6, a plow 33, provided to open a furrow in the soil, a suitable carriage supported on two drive wheels detachably geared to and operating the said revolving disk, the covering shovels 34 and 35, suitable lever-operated tilting mechanism for raising or lowering said plow 33, and said shovels 34 and 35, all substantially as set forth.

3. A potato planter, comprising a horizontally revolving disk and means for operating same from the driving gear connected with the drive wheels of the planter, the clutch connection 15 and 16, between said disk and the drive wheels of the machine and means for operating same, a plurality of cutting blades 2, attached rigidly to said disk and extending radially and on the same plane from its edge, a downwardly and backwardly projecting lip 3, on the rear edge of each of said cutting blades, to engage a potato cutting, a receptacle for carrying a supply of potato seed, an outlet in the bottom of said receptacle, a downwardly projecting spout extending from said outlet to convey the potato seed to a removable holder tube, above the path of said blades, a table below said holder tube and provided with a downwardly projecting clip, having an elongated hole and a clamping bolt for adjusting said table relative to the said blades, a well tube below said blades at one side of the said removable holder tube, to receive the potato seed cutting immediately after it is forced from the said table, the cleaning guard 10, projecting above and on the left side of the well tube 6, to prevent the passage of a potato seed cutting over the top of the said well tube 6, a plow 33 to open a furrow in the soil, a suitable carriage supported on two drive wheels detachably geared to and operating the said revolving disk, the covering shovels 34 and 35, to fill the furrow opened by the said plow 33, a suitable lever-operated tilting mechanism for raising or lowering said plow 33, and said shovels 34 and 35, all substantially as set forth.

STEPHEN E. McKNIGHT.

Witnesses:
 PARIS HIATT,
 H. K. WING.